(12) United States Patent (10) Patent No.: US 12,652,479 B2
Nishizawa (45) Date of Patent: Jun. 9, 2026

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Hideta Nishizawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 18/636,396

(22) Filed: Apr. 16, 2024

(65) Prior Publication Data

US 2024/0397237 A1     Nov. 28, 2024

(30) Foreign Application Priority Data

May 24, 2023     (JP) ................................. 2023-085707

(51) Int. Cl.
*H04N 25/78* (2023.01)
*H04N 25/76* (2023.01)
(52) U.S. Cl.
CPC ......... *H04N 25/78* (2023.01); *H04N 25/7795* (2023.01)
(58) Field of Classification Search
CPC .. H04N 25/78; H04N 25/7795; H04N 23/667; H04N 23/741; H04N 25/575; H04N 25/58; H04N 25/40; H04N 25/51
See application file for complete search history.

(56) References Cited

U.S. PATENT DOCUMENTS

| 10,979,067 | B2 | 4/2021 | Sakai | |
| 2017/0006206 | A1* | 1/2017 | Song | H04N 25/78 |
| 2018/0027202 | A1* | 1/2018 | Ishii | H04N 25/78 |
| | | | | 348/308 |
| 2022/0394203 | A1 | 12/2022 | Matsuura | |
| 2023/0064463 | A1* | 3/2023 | Ma | H04N 25/50 |
| 2023/0109210 | A1 | 4/2023 | Watanabe | |

FOREIGN PATENT DOCUMENTS

| JP | 2015128253 A | 7/2015 |
| JP | 2022144244 A | 10/2022 |

OTHER PUBLICATIONS

The above patent documents were cited in a European Search Report issued on Sep. 30, 2024, a which is enclosed, that issued in the corresponding European Patent Application No. 24170757.9.

* cited by examiner

*Primary Examiner* — Timothy J Henn
(74) *Attorney, Agent, or Firm* — Cowan, Liebowitz & Latman, P.C.

(57)     ABSTRACT
An image capturing apparatus includes a pixel for performing a photoelectric conversion, an AD converter configured to perform an AD conversion of a signal of the pixel, and a control unit configured to perform an AD conversion in either a first AD conversion mode in which an image signal is obtained by performing an AD conversion by comparing the signal of the pixel with one of a plurality of reference signals with different gradients of a temporal change of a signal level or a second AD conversion mode in which a plurality of image signals with different gains are obtained by performing a plurality of AD conversions by comparing a signal of one pixel with a plurality of reference signals with different gradients of a temporal change of a signal level.

10 Claims, 13 Drawing Sheets

F I G. 2
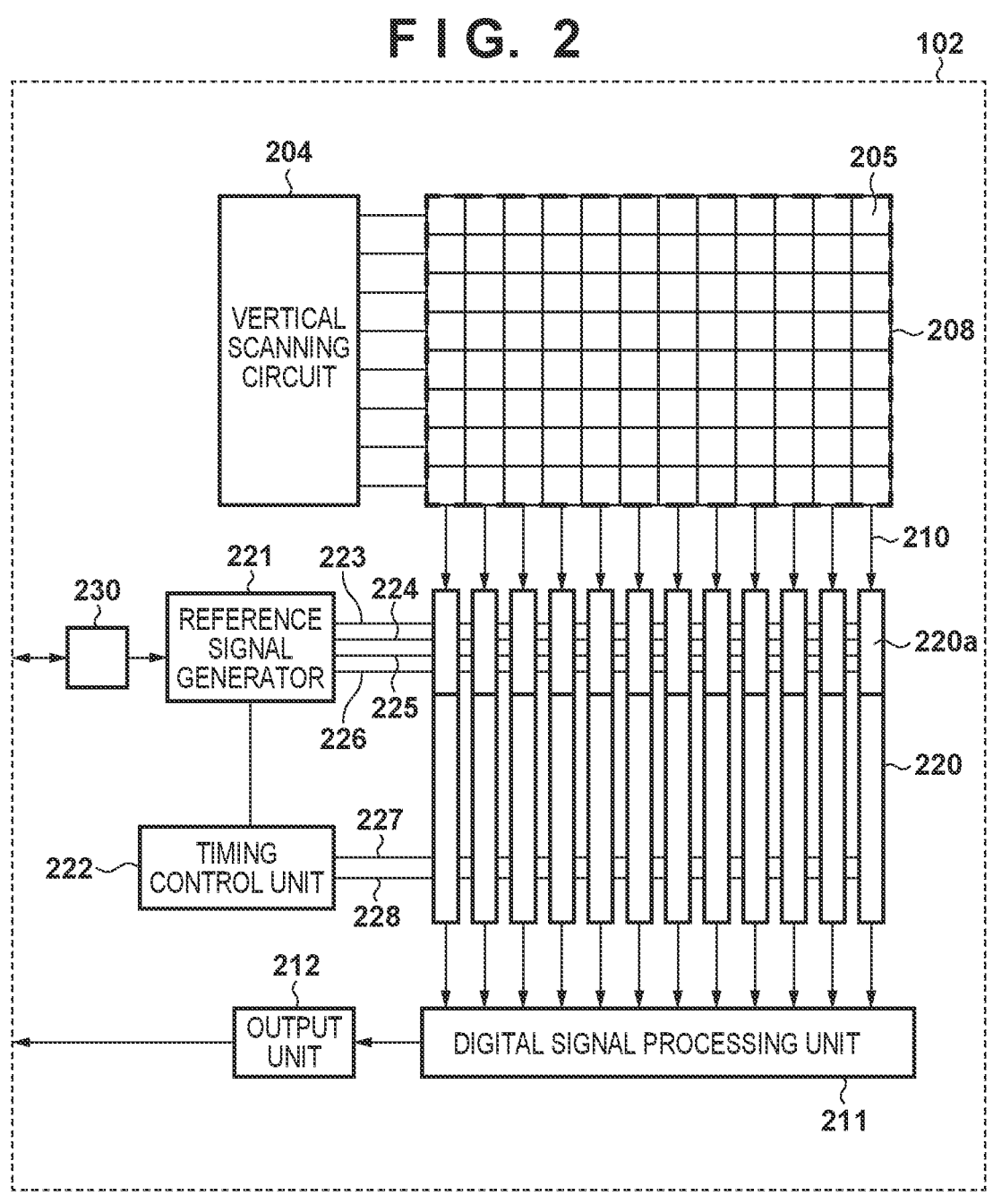

F I G. 5

| MODE | AD MODE | SYNTHESIS METHOD |
|---|---|---|
| NORMAL IMAGE CAPTURING (HIGH-SPEED READING/ NORMAL IMAGE QUALITY) | NORMAL BIT DS AD | |
| HDR SS MODE (HIGH-DEFINITION HDR MODE) | PERFORM HIGH BIT SS AD TWICE | IMAGE PROCESSING ON 2 IMAGE |

F I G. 6
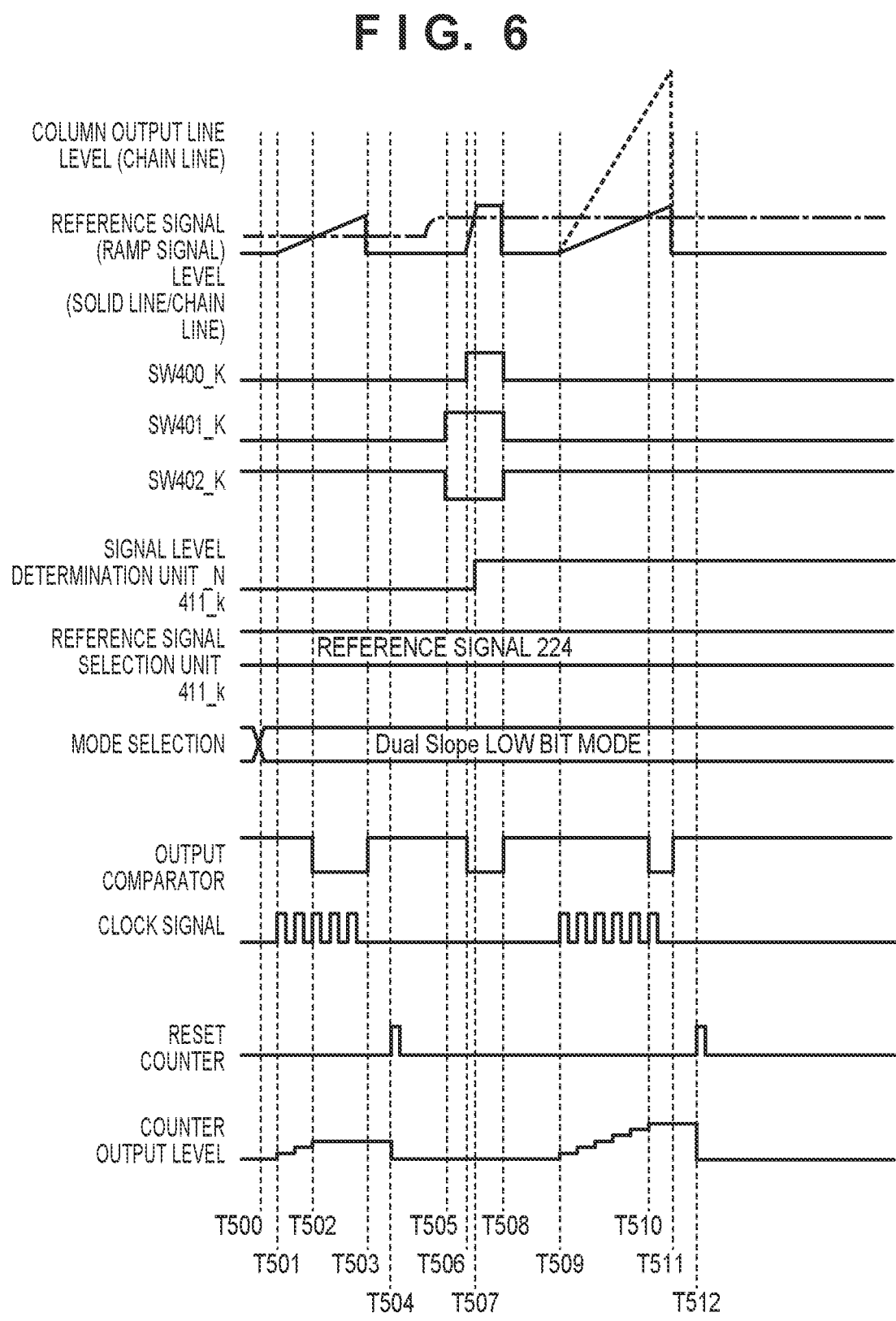

F I G. 7
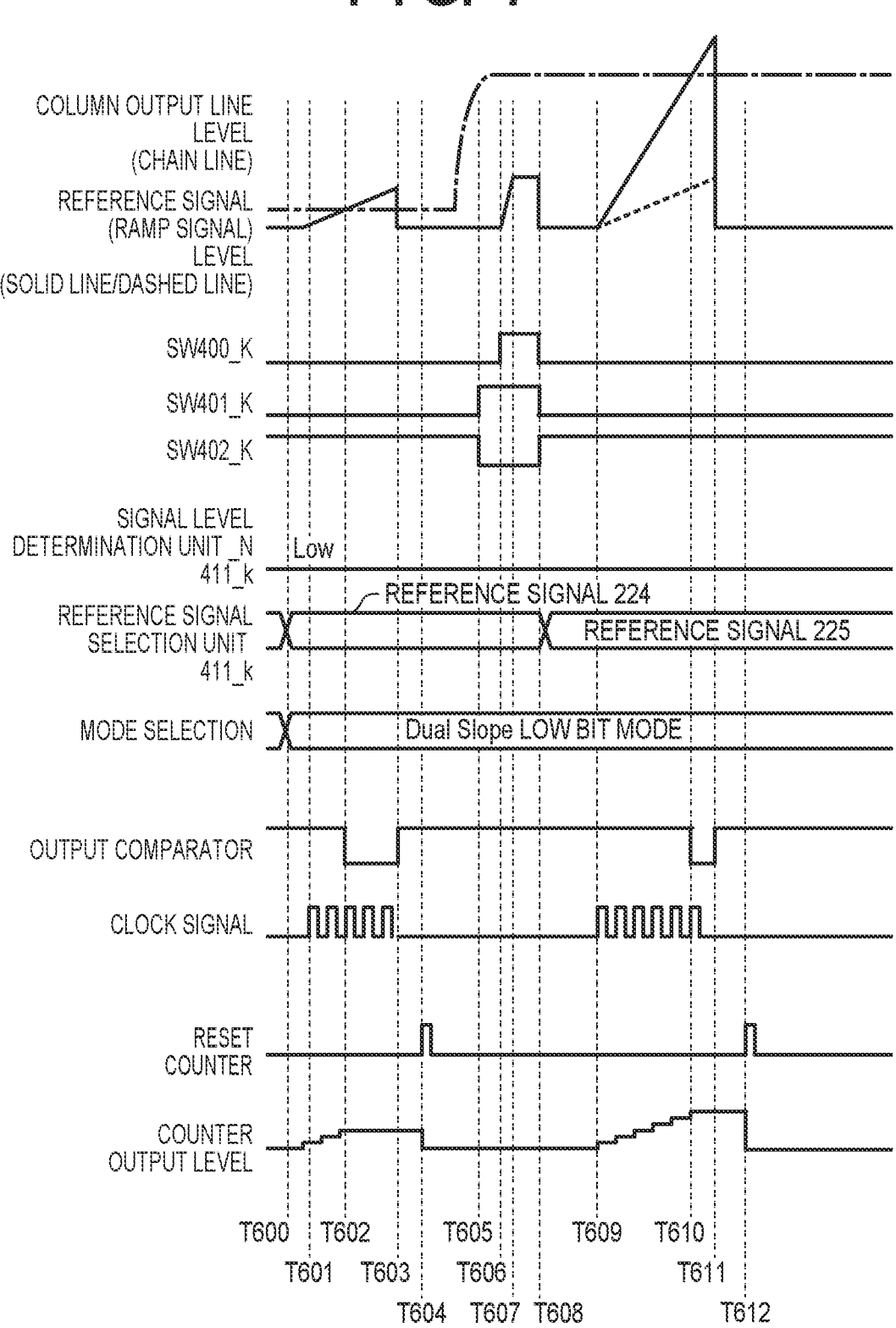

F I G.   8
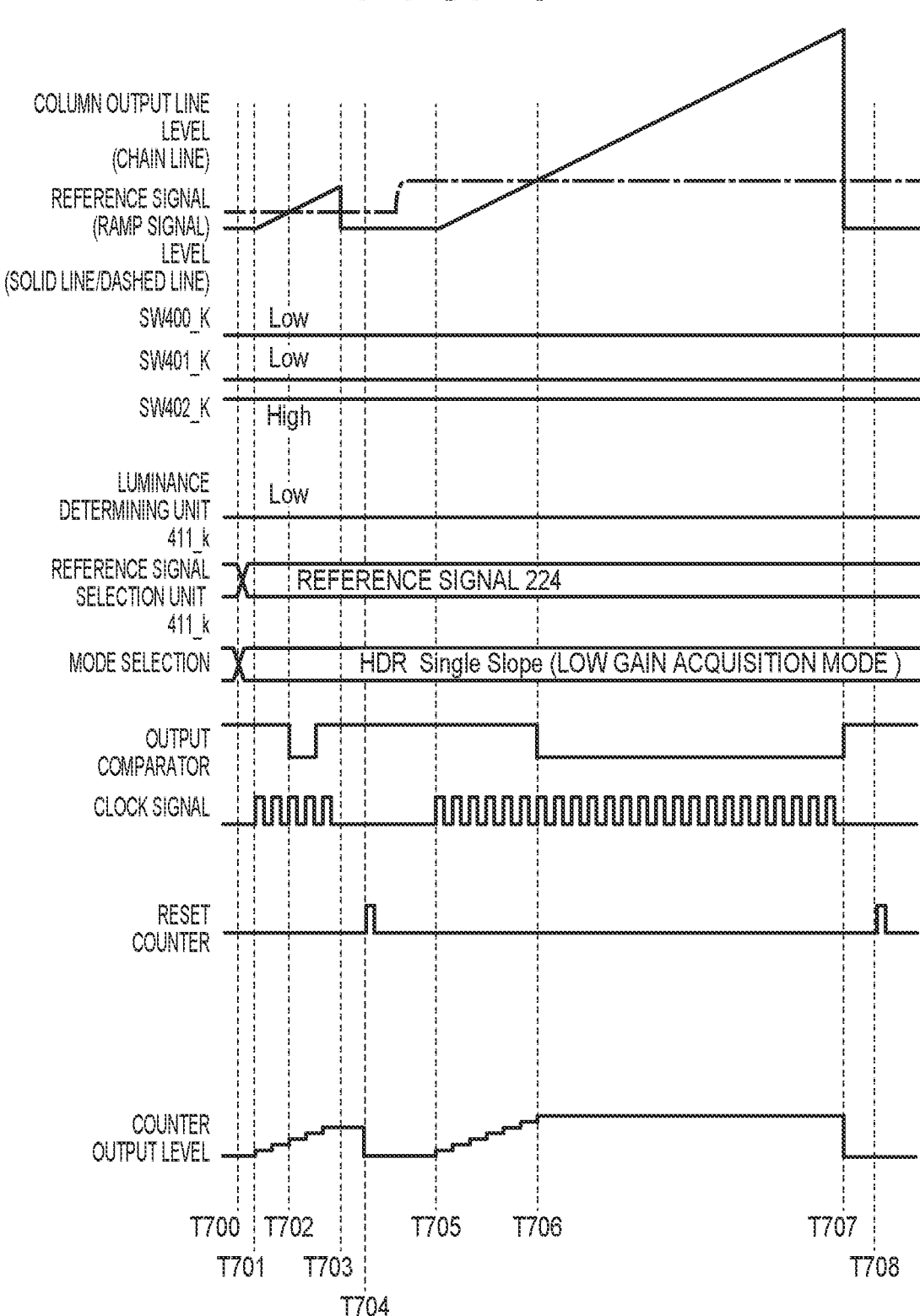

F I G. 10

| MODE | AD MODE | SYNTHESIS METHOD |
|---|---|---|
| NORMAL IMAGE CAPTURING (HIGH-SPEED READING/ NORMAL IMAGE QUALITY) | NORMAL BIT DS AD | |
| HDR DS MODE (HIGH-SPEED READING AND HIGH-QUALITY) | PERFORM HIGH BIT DS AD ONCE | IMAGE PROCESSING ON ONE OUTPUT |

F I G. 11
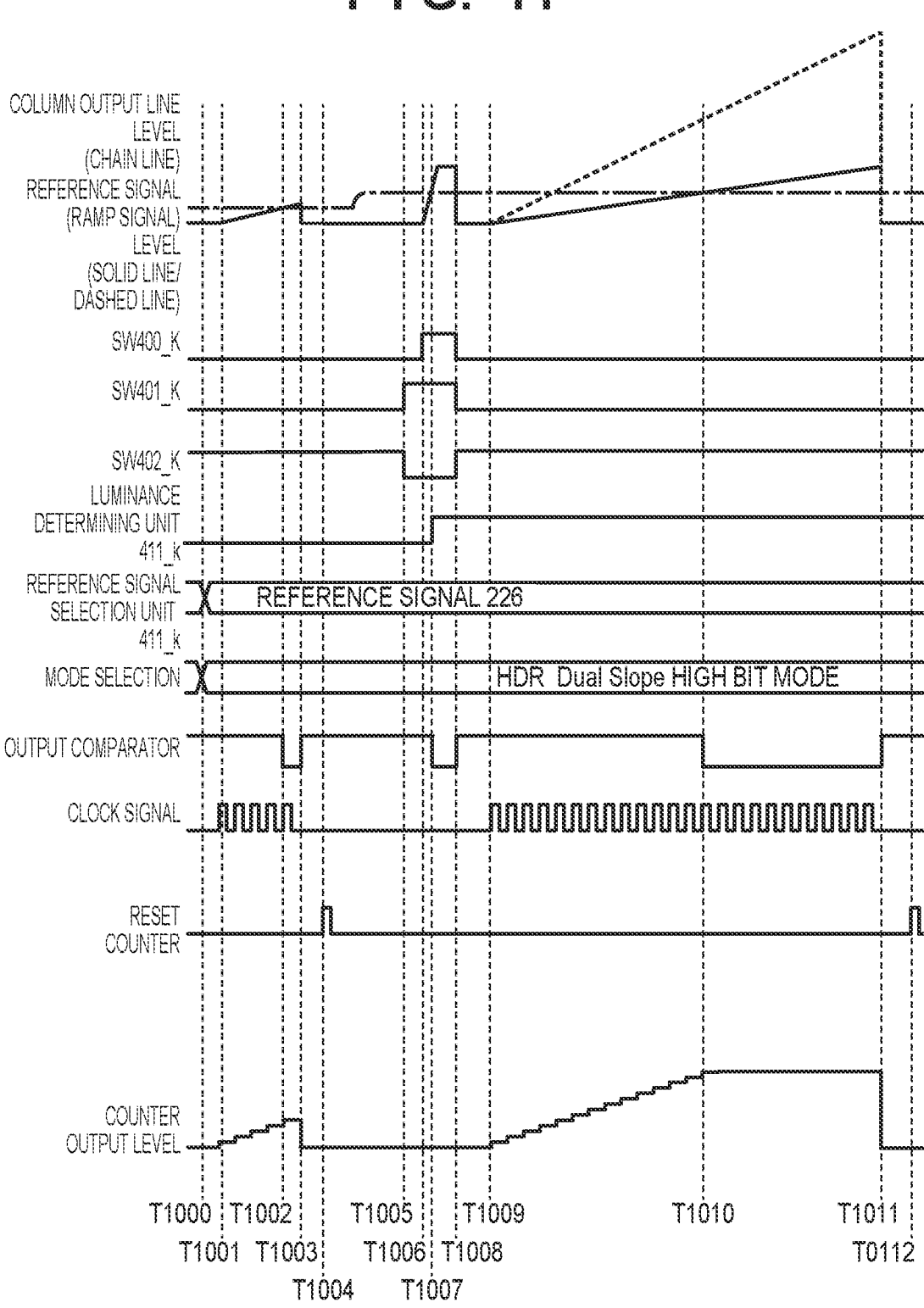

F I G. 13

| MODE | AD MODE | SYNTHESIS METHOD |
|---|---|---|
| HDR SS MODE (HIGH-DEFINITION HDR MODE) | PERFORM HIGH BIT SS AD TWICE | IMAGE PROCESSING ON TWO OUTPUTS |
| HDR DS MODE (HIGH-SPEED READING AND HIGH-QUALITY) | PERFORM HIGH BIT DS AD ONCE | IMAGE PROCESSING ON ONE OUTPUT |

IMAGE CAPTURING APPARATUS, METHOD FOR CONTROLLING THE SAME, AND STORAGE MEDIUM

BACKGROUND OF THE INVENTION

Field of the Invention

The present invention relates to an image capturing apparatus and a method for controlling the same.

Description of the Related Art

Conventionally, as a pixel signal reading circuit in an image sensor, a configuration in which a pixel signal outputted from a pixel to a column output line is AD converted (analog/digital conversion) in a column circuit provided for each pixel column is known.

Japanese Patent Laid-Open No. 2022-144244 describes a dual slope type AD converter that increases a readout speed by switching a slope of a ramp signal according to a signal level when a pixel signal is AD converted.

Further, Japanese Patent Laid-Open No. 2015-128253 discloses a technique of expanding a dynamic range by simultaneously amplifying signals of the same pixel with different gains.

However, there is a problem in that if a dual slope type AD conversion is performed to increase the readout speed, and also different gain outputs are obtained to increase the dynamic range, a circuit scale of wiring, a selector, or the like in the image capturing apparatus will become larger.

SUMMARY OF THE INVENTION

The present disclosure has been made in view of the above-described problem, and provides an image capturing apparatus that is provided with a dual slope type AD converter, and that can obtain output of different gains for signals of the same pixel without increasing the circuit scale.

According to a first aspect of the present invention, there is provided an image capturing apparatus, comprising: a pixel for performing a photoelectric conversion; an AD converter configured to perform an AD conversion of a signal of the pixel; at least one processor or circuit configured to function as: a control unit configured to perform an AD conversion with the AD converter in either a first AD conversion mode in which an image signal is obtained by performing an AD conversion by comparing the signal of the pixel with one of a plurality of reference signals with different gradients of a temporal change of a signal level from each other or a second AD conversion mode in which a plurality of image signals with different gains from each other are obtained by performing a plurality of AD conversions by comparing a signal of one pixel with a plurality of reference signals with different gradients of a temporal change of a signal level from each other.

According to a second aspect of the present invention, there is provided a method for controlling an image capturing apparatus comprising a pixel for performing a photoelectric conversion and an AD converter for performing an AD conversion of a signal of the pixel, the method comprising: performing control to perform an AD conversion with the AD converter in either a first AD conversion mode in which an image signal is obtained by performing an AD conversion by comparing the signal of the pixel with one of a plurality of reference signals with different gradients of a temporal change of a signal level from each other or a second AD conversion mode in which a plurality of image signals with different gains from each other are obtained by performing a plurality of AD conversions by comparing a signal of one pixel with a plurality of reference signals with different gradients of a temporal change of a signal level from each other.

Further features of the present invention will become apparent from the following description of exemplary embodiments with reference to the attached drawings.

BRIEF DESCRIPTION OF THE DRAWINGS

FIG. 2 is a simplified configuration diagram of an image capturing element.

FIG. 5 is a view illustrating image capturing modes in the first embodiment.

FIG. 6 is a timing chart illustrating an operation at a low signal level of DS_AD.

FIG. 7 is a timing chart illustrating an operation at a high signal level of DS_AD.

FIG. 8 is a timing chart illustrating an operation at a low gain of HDR_SS_AD.

FIG. 10 is a view illustrating image capturing modes in a second embodiment.

FIG. 11 is a timing chart illustrating an operation at a low signal level of HDR_DS_AD.

FIG. 13 is a view illustrating image capturing modes in a third embodiment.

DESCRIPTION OF THE EMBODIMENTS

Figure 1:
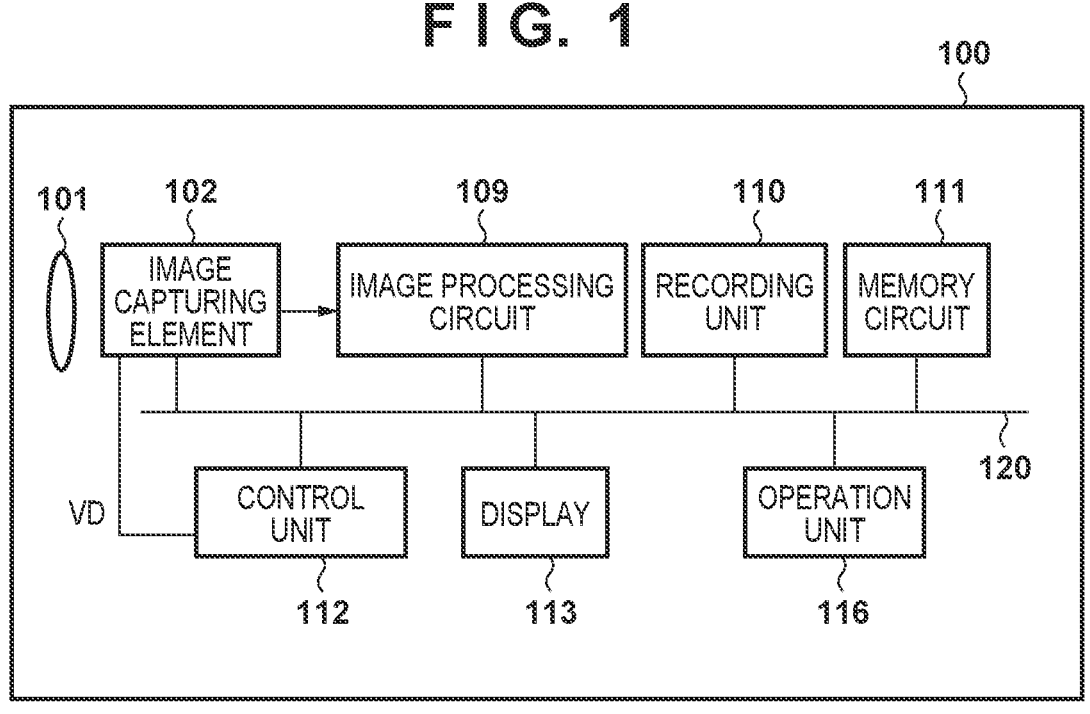
FIG. 1 is a block diagram illustrating a configuration of an image capturing apparatus in a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of an image capturing apparatus 100 in a first embodiment of the present invention.

In FIG. 1, a lens unit 101 condenses incident light from a subject and forms an image on an image capturing element 102. The lens unit 101 is configured to include, for example, a plurality of lenses, a diaphragm, and the like. The image capturing element 102 photoelectrically converts a subject image formed by the lens unit 101 and outputs image data.

A control unit 112 performs control of the entire image capturing apparatus 100 such as driving of the image capturing element 102 and control of an image processing circuit 109. The control unit 112 also controls acceptance of instructions from a display unit 113 and an operation unit 116 and transfer of data to a memory circuit 111 and a recording unit 110. Note that the control unit 112 may be provided in the image capturing element 102 or the image processing circuit 109.

The image processing circuit 109 performs development processing such as color matrix processing and gamma processing on the image data from the image capturing element 102. In these processes, the image processing circuit 109 causes the memory circuit 111 to store image data as necessary. Then, the image processing circuit 109 outputs the processed image data to the display unit 113 and the recording unit 110.

The display unit 113 displays image data and the like outputted from the image processing circuit 109. The operation unit 116 sends an operation signal to the control unit 112 in accordance with an operation performed by the user.

A bus 120 is a common path for the image capturing element 102, the image processing circuit 109, the display unit 113, the operation unit 116, the recording unit 110, and the memory circuit 111 to exchange data with each other.

FIG. 2 is a simplified configuration diagram of the image capturing element 102.

In a pixel region 208, a plurality of unit pixels 205 are arranged two-dimensionally (in a matrix). A vertical arrangement of the unit pixels 205 in the pixel region 208 is referred to as a "column", and a horizontal arrangement is referred to as a "row".

The pixel signals outputted from the respective unit pixels 205 are outputted to column output lines 210 and further inputted to a column circuit 220. In the column circuit 220, an analog-to-digital converter (hereinafter referred to as an AD converter) 220a is arranged. A detailed description of the column circuit including the AD converter 220a will be given later with reference to FIG. 4.

The AD converter 220a is connected to a reference signal generator 221 and a timing control unit 222. The reference signal generator 221 supplies a reference signal (ramp signal) to the AD converter 220a via a plurality of reference signal lines 223, 224, 225, and 226. The timing control unit 222 supplies a clock for counting via a clock line 227, and supplies a reset signal for counting via a reset signal line 228.

In addition, a register setting unit 230 is arranged in the image capturing element 102, the image capturing mode is designated therein by the control unit 112, and the designated mode signal is outputted to the reference signal generator 221 therefrom.

A digital signal outputted from the column circuit 220 is inputted to a digital signal processing unit 211, subjected to processing such as dark offset correction and gain correction, and outputted to the outside of the image capturing element 102 via an output unit 212.

Figure 3:
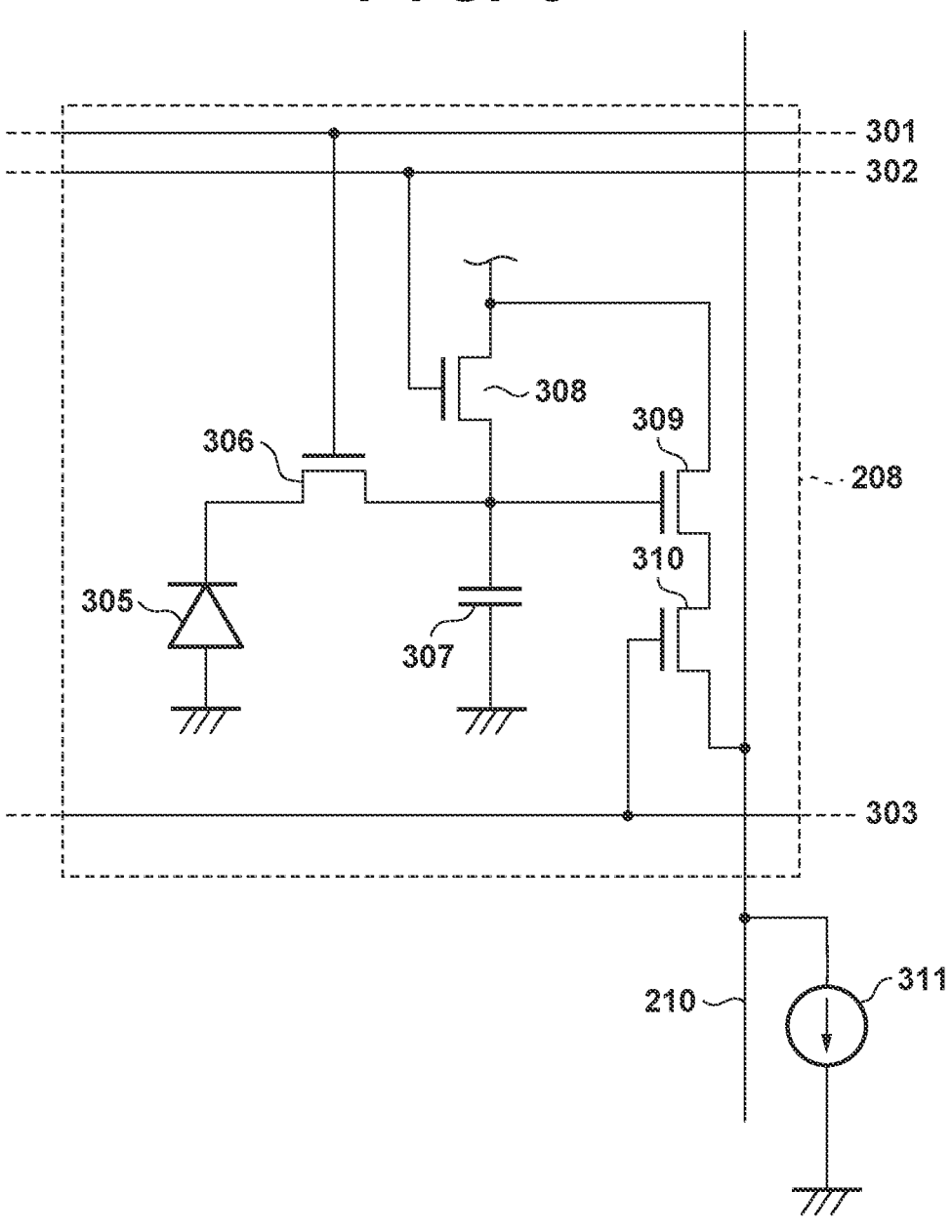
FIG. 3 is an equivalent circuit diagram of a unit pixel.

FIG. 3 is an equivalent circuit diagram of the unit pixel 205.

The electric charges generated and accumulated in a photodiode 305 in response to the incident light are transferred to a floating diffusion unit (hereinafter, referred to as FD unit) 307 by turning on a transfer switch 306 by a transfer control signal 301. A source follower amplifier 309 is configured together with a constant current source 311 connected to the column output line 210, amplifies a voltage signal based on the electric charges accumulated in an FD unit 307, and outputs the amplified voltage signal as a pixel signal. The output of the source follower amplifier 309 is outputted to the column output line 210 when a row selection control signal 303 turns on a row selection switch 310.

When the unnecessary charge accumulated in the FD 307 is reset, a reset switch 308 is turned on by a reset control signal 302. Further, when the photodiode 305 is reset, the reset switch 308 is turned on, and the transfer switch 306 is turned on by the transfer control signal 301. The transfer control signal 301, the reset control signal 302, and the row selection control signal 303 are outputted from a vertical scanning circuit 204 in response to a command from the control unit 112.

Figure 4:
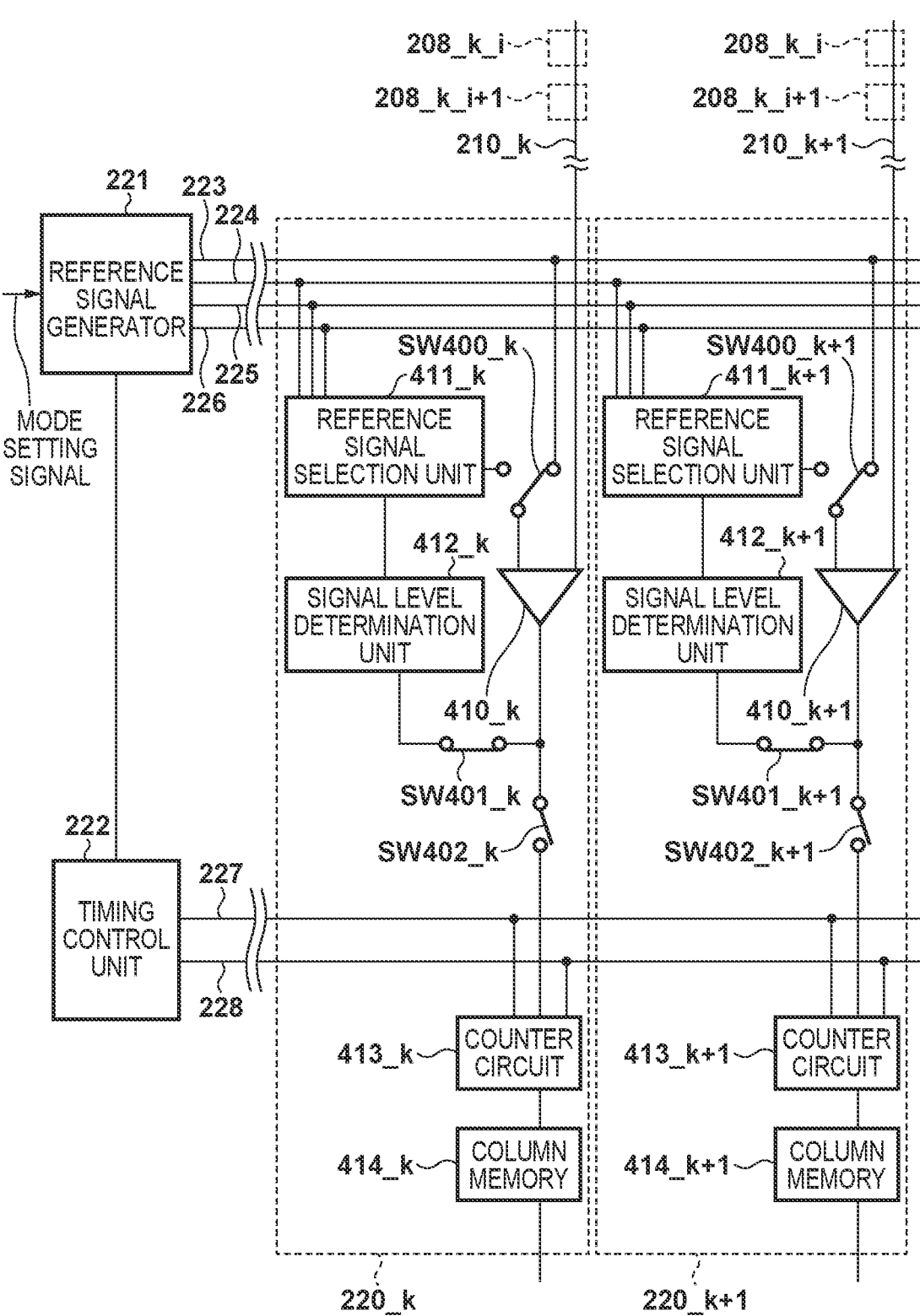
FIG. 4 is a view illustrating a configuration of an AD converter of an image capturing element.

FIG. 4 is a view illustrating a circuit configuration of an AD converter of an image capturing element. In FIG. 4, a column circuit 220_k of a k-th column and a column circuit 220_k+1 of a k+1-th column are illustrated. Since the column circuits of the respective columns have the same configuration, the column circuit 220_k of the k-th column (which may be simply referred to as the column circuit 220) will be described as an example. In addition, in AD conversion methods, a method of performing AD conversion by using two ramp signals whose slopes differ from each other according to a signal level is referred to as Dual_Slope_AD (hereinafter, referred to as DS_AD) and a method of performing AD conversion by using a single ramp signal is referred to as Single_Slope_AD (hereinafter, referred to as SS_AD).

The reference signal generator 221 supplies a luminance determination reference signal 223, a DS_AD low luminance reference signal 224, a DS_AD high luminance reference signal 225, and an SS_AD low luminance reference signal 226 to each column circuit 220. These reference signals each differ in the gradient of the slope of the signal waveform. A switch SW 400_k is a switch that selects the luminance determination reference signal 223 or a reference signal selected by a reference signal selection unit 411_k.

A pixel signal from the column output line 210k is inputted to one input of a comparator 410_k, and the reference signal selected by the SW 400_k is inputted to the other. The comparison result of the comparator 410_k is inputted to a signal level determination unit 412_k via a switch SW 401_k. Similarly, the comparison result of the comparator 410_k is inputted to a counter circuit 413_k via a switch SW 402_k.

In the counter circuit 413_k, the counter is driven in synchronization with the reference signals. Further, a clock signal 227 for operating the counter circuit 413_k is supplied from the timing control unit 222. Further, a reset signal 228 for resetting the counter in the counter circuit 413_k is supplied from the timing control unit 222. The output of the signal level determination unit 412_k is outputted to the reference signal selection unit 411_k.

Further, a mode setting signal for setting the image capturing mode is inputted to the reference signal generator 221 and reflected in the selection of the reference signal.

Next, image capturing modes according to the present embodiment will be described with reference to FIG. 5.

As described already above, in FIG. 5, dual slope AD conversion (DS_AD) is a method in which AD conversion is performed by switching two types of ramp signals whose signal levels are temporally changed in a triangular waveform, in accordance with the signal level of a pixel signal.

In addition, SS_AD is a method of performing AD conversion using a ramp signal having one type of slope in which a signal level changes in a triangular waveform.

In addition, high dynamic range (HDR) image capturing is an image capturing method in which a plurality of image signals (two in the present embodiment) having differing exposures are synthesized to obtain a single image signal in which a dynamic range is enlarged. It should be noted that normal image capturing referred to below refers to image capturing in which standard dynamic range (SDR) images are obtained.

In FIG. 5, normal bit DS_AD is used for AD conversion in the normal image capturing mode. In the high dynamic range single slope mode (HDR_SS mode), which is another AD conversion mode, high bit SS_AD with a low gain and high bit SS_AD with a high gain are performed. In other words, two AD conversions are performed on the output signals of all the pixels, and two images are synthesized after AD conversion. In normal bit DS_AD, readout can be at high speed. In contrast to this, in the HDR_SS mode, since high-bit SS_AD, in which the number of bits is increased, is performed twice, the readout time is slightly longer, but a high-definition image can be acquired.

FIG. 6 is a timing chart for when the image signal is at a low level in normal bit DS_AD at the time of normal image capturing. FIG. 7 is a timing chart illustrating the operation of DS_AD when the pixel signal is at a high level. In DS_AD, an operation illustrated in the timing chart of either FIG. 6 or FIG. 7 is performed according to the signal level of each pixel.

First, the operation of DS_AD when the image signal is at a low level will be described with reference to the timing chart of FIG. 6.

At time T500 of FIG. 6, the control unit 112 makes a setting for driving in the DS_AD normal bit mode in the register setting unit 230. The setting is also reflected in the reference signal generator 221. Here, the DS_AD low luminance reference signal 224 is selected.

At time T501, the control unit 112 instructs the timing control unit 222 to output a clock signal of a predetermined cycle to the counter circuit 413 while the reference signal generator 221 scans the ramp signal. The counter circuit 413 counts the clock signal. Note that bit precision varies depending on the scanning period of the clock cycle, and increasing the scanning period increases the bit precision.

Since a reset release level and the ramp signal level of the pixel coincide with each other at time T502, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T503, the control unit 112 controls the timing control unit 222 to set the reference signal level to an initial value. The output of the comparator 410 is set to HIGH.

At time T504, the control unit 112 controls the timing control unit 222 to store the counter value of a reset release level in a reset release level memory in a column memory 414. The counter circuit 413 is reset to an initial level via the reset signal 228. Thereafter, the pixel signal level is read out to the column output line 210.

At time T505, the control unit 112 controls the respective switch signals in order to perform a luminance determination. To input the result of the comparator 410 to the signal level determination unit 412, the control unit 112 sets the switch SW 401 to HIGH. The switch SW 402 is set to LOW to disconnect the counter circuit 413.

At time T506, the control unit 112 switches the switch SW 400 and inputs the luminance determination reference signal 223 to the comparator 410.

At time T507, since the luminance determination reference signal 223 and the signal level coincide with each other within a predetermined period, the output of the comparator 410 changes from HIGH to LOW. In the example of FIG. 6, the signal level is low, the signal level determination unit 412 determines that the signal level is low (determination result), and the reference signal selection unit 411 selects the DS_AD low luminance reference signal 224.

At time T508, in order to finish the luminance determination, the control unit 112 sets the switches SW 400 and SW 401 to LOW and sets the switch SW 402 to HIGH. The output of the comparator 410 is set to HIGH.

At time T509, in order to AD convert the pixel signal level, the control unit 112 controls the reference signal generator 221 and starts scanning the ramp signal from the initial level. Also, the control unit 112 controls the timing control unit 222 to output a clock signal of a predetermined cycle to the counter circuit 413 while the reference signal generator 221 scans the ramp signal.

Since the signal level and the ramp signal level coincide with each other at time T510, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T511, the control unit 112 controls the timing control unit 222 to set the reference signal level to an initial value. Also, the output of the comparator 410 is set to HIGH.

At time T512, the control unit 112 controls the timing control unit 222 to store the counter value of the signal level in the signal level memory in the column memory 414. The counter circuit 413 is reset to an initial level via the reset signal 228. The column memory 414 calculates a difference between the stored pixel signal level and the reset release level, and outputs the result to the digital signal processing unit 211. By repeating this operation for each row, an image signal of the image capturing element 102 is read out.

Next, the operation of DS_AD when the image signal is at a high level will be described with reference to the timing chart of FIG. 7.

At time T600 of FIG. 7, the control unit 112 makes a setting for driving in the DS_AD normal bit mode in the register setting unit 230. The setting is also reflected in the reference signal generator 221. Here, the DS_AD low luminance reference signal 224 is selected.

At time T601, the control unit 112 instructs the timing control unit 222 to output a clock signal of a predetermined cycle to the counter circuit 413 while the reference signal generator 221 scans the ramp signal. The counter circuit 413 counts the clock signal.

Since the reset release level and the ramp signal level of the pixel coincide with each other at time T602, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T603, the control unit 112 controls the timing control unit 222 to set the reference signal level to an initial value. The output of the comparator 410 is set to HIGH.

At time T604, the control unit 112 controls the timing control unit 222 to store the counter value of the reset release level in the reset release level memory in the column memory 414. The counter circuit 413 is reset to an initial level via the reset signal 228. Thereafter, the pixel signal level is read out to the column output line 210.

At time T605, the control unit 112 controls the respective switch signals in order to perform the luminance determination. To input the result of the comparator 410 to the signal level determination unit 412, the control unit 112 sets the switch SW 401 to HIGH. The switch SW 402 is set to LOW to disconnect the counter circuit 413.

At time T606, the control unit 112 switches the switch SW 400 and inputs the luminance determination reference signal 223 to the comparator 410.

Since there was no timing at which the luminance determination reference signal 223 and the signal level coincided with each other up to time T607, the signal level determination unit 412 determines that the signal level is high, and the reference signal selection unit 411 selects the DS_AD high luminance reference signal 225.

At time T607, in order to finish the luminance determination, the control unit 112 sets the switches SW 400 and SW 401 to LOW and sets the switch SW 402 to HIGH. The output of the comparator 410 is set to HIGH.

At time T609, in order to AD convert the pixel signal level, the control unit 112 controls the reference signal generator 221 and starts scanning the ramp signal from the initial level. Also, the control unit 112 controls the timing control unit 222 to output a clock signal of a predetermined cycle to the counter circuit 413 while the reference signal generator 221 scans the ramp signal.

Since the signal level and the ramp signal level coincide with each other at time T610, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T611, the control unit 112 controls the timing control unit 222 to set the reference signal level to an initial value. The output of the comparator 410 is set to HIGH.

At time T612, the control unit 112 controls the timing control unit 222 to store the counter value of the signal level in the signal level memory in the column memory 414. The counter circuit 413 is reset to an initial level via the reset signal 228. The column memory 414 calculates a difference between the stored pixel signal level and the reset release level, and outputs the result to the digital signal processing unit 211. By repeating this operation for each row, an image signal of the image capturing element 102 is read out.

FIG. 8 is a timing chart illustrating the operation of SS_AD when the low gain reference signal is used in HDR mode.

At time T700, the control unit 112 makes a setting for driving in HDR SS_AD with the low gain in the register setting unit 230. The setting is also reflected in the reference signal generator 221. Here, the DS_AD low luminance reference signal 224 is shared by the SS_AD when the low gain reference signal is used.

At time T701, the control unit 112 instructs the timing control unit 222 to output a clock signal of a predetermined cycle to the counter circuit 413 while the reference signal generator 221 scans the ramp signal. The counter circuit 413 counts the clock signal.

Since the reset release level and the ramp signal level of the pixel coincide with each other at time T702, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T703, the control unit 112 controls the timing control unit 222 to set the reference signal level to an initial value. The output of the comparator 410 is set to HIGH.

At time T704, the control unit 112 controls the timing control unit 222 to store the counter value of the reset release level in the reset release level memory in the column memory 414. The counter circuit 413 is reset to an initial level via the reset signal 228. Thereafter, the pixel signal level is read out to the column output line 210.

At time T705, in order to AD convert the pixel signal level, the control unit 112 controls the reference signal generator 221 and starts scanning the ramp signal from the initial level. Also, the control unit 112 controls the timing control unit 222 to output a clock signal of a predetermined cycle to the counter circuit 413 while the reference signal generator 221 scans the ramp signal.

Since the signal level and the ramp signal level coincide with each other at time T706, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T707, the control unit 112 controls the timing control unit 222 to set the reference signal level to an initial value. The output of the comparator 410 is set to HIGH. In the SS_AD in HDR mode, the scan time of the ramp signal is longer than that in DS mode in order to obtain more accurate data.

At time T708, the control unit 112 controls the timing control unit 222 to store the counter value of the signal level in the signal level memory in the column memory 414. The counter circuit 413 is reset to an initial level via the reset signal 228. The column memory 414 calculates a difference between the stored pixel signal level and the reset release level, and outputs the result to the digital signal processing unit 211. By repeating this operation for each row, an HDR low-gain image signal of the image capturing element 102 is read out.

Figure 9:
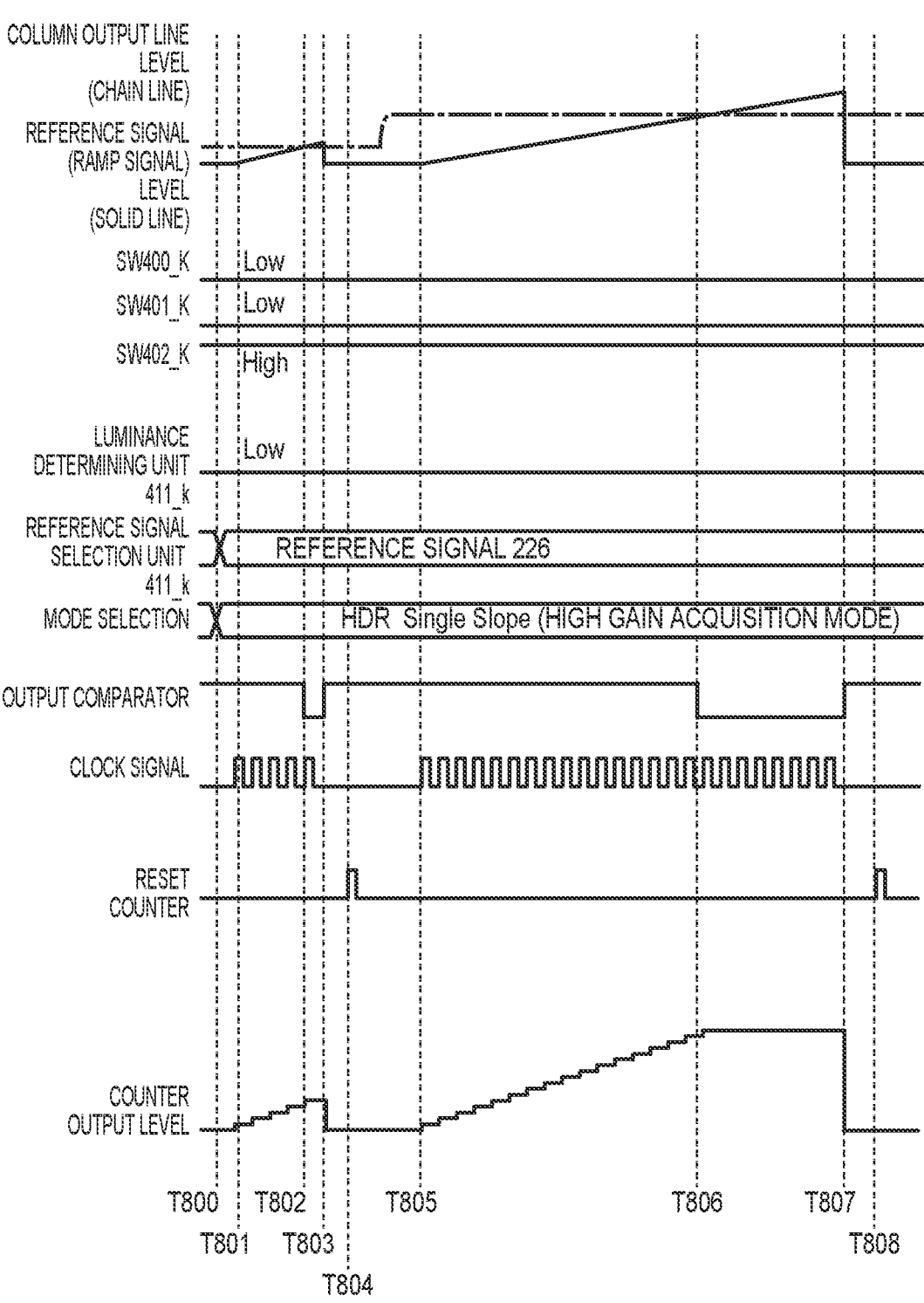
FIG. 9 is a timing chart illustrating an operation at a high gain of HDR_SS_AD.

FIG. 9 is a timing chart illustrating the operation of SS_AD when a high gain reference signal is used in HDR mode.

At time T800, the control unit 112 makes a setting for driving in HDR_SS_AD with the high gain in the register setting unit 230. The setting is also reflected in the reference signal generator 221. Here, the SS_AD low luminance reference signal 226 is selected.

At time T801, the control unit 112 instructs the timing control unit 222 to output a clock signal of a predetermined cycle to the counter circuit 413 while the reference signal generator 221 scans the ramp signal. The counter circuit 413 counts the clock signal.

Since the reset release level and the ramp signal level of the pixel coincide with each other at time T802, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T803, the control unit 112 controls the timing control unit 222 to set the reference signal level to an initial value. The output of the comparator 410 is set to HIGH.

At time T804, the control unit 112 controls the timing control unit 222 to store the counter value of the reset release level in the reset release level memory in the column memory 414. The counter circuit 413 is reset to an initial level via the reset signal 228. Thereafter, the pixel signal level is read out to the column output line 210.

At time T805, in order to AD convert the pixel signal level, the control unit 112 controls the reference signal generator 221 and starts scanning the ramp signal from the initial level. Also, the control unit 112 controls the timing control unit 222 to output a clock signal of a predetermined cycle to the counter circuit 413 while the reference signal generator 221 scans the ramp signal.

Since the signal level and the ramp signal level coincide with each other at time T806, the output of the comparator 410 changes from HIGH to LOW. Since LOW output of the comparator 410 serves as an enable for the counter circuit 413, the counter circuit 413 stops counting when it becomes LOW. Note that, although the signal level is the same level as the signal level in FIG. 8, since the slope of the reference signal is in a gentle, high gain state, the output is a large output. All pixels tend to be the same.

When the ramp signal is scanned to a predetermined level at time T807, the control unit 112 controls the timing control unit 222 to set the reference signal level to an initial value. The output of the comparator 410 is set to HIGH. In the SS_AD in HDR mode, the scan time of the ramp signal is longer than that in DS mode in order to obtain more accurate data.

At time T808, the control unit 112 controls the timing control unit 222 to store the counter value of the signal level in the signal level memory in the column memory 414. The counter circuit 413 is reset to an initial level via the reset signal 228. The column memory 414 calculates a difference between the stored pixel signal level and the reset release level, and outputs the result to the digital signal processing unit 211. By repeating this operation for each row, an HDR high-gain image signal of the image capturing element 102 is read out.

In high-bit SS_AD in HDR mode, the reading is performed a plurality of times (two times in the present embodiment) with different gains, and the low-gain image as illustrated in FIG. 8 and the high-gain image as illustrated in FIG. 9 are each acquired, and the images are appropriately synthesized by the image processing circuit 109. For example, a high gain signal is selected for a low luminance portion, and a low gain signal is selected for a high luminance portion primarily. Alternatively, the pixel values calculated from the respective pixels may be synthesized. Note that the circuit for performing synthesis may be either the image processing circuit 109 or a circuit in the image capturing element 102.

As described above, by switching modes in an image capturing apparatus equipped with DS_AD, which has been used for high-speed reading thus far, by switching between DS_AD at time of normal image capturing and a high-bit SS_AD method in HDR mode, it is possible to obtain an HDR image synthesized from image data with higher accuracy than that of the DS_AD of normal image capturing.

Second Embodiment

In the second embodiment, an embodiment in which DS_AD is performed differently than in the normal state when HDR images are generated will be described.

FIG. 10 illustrates normal image capturing and HDR_DS_AD driving modes. In the normal SDR image capturing mode, normal bit DS_AD is performed, and in the HDR_DS_AD mode. High-bit AD is performed once for each pixel in DS_AD, and low-level and high-level images are output-ted.

Figure 12:
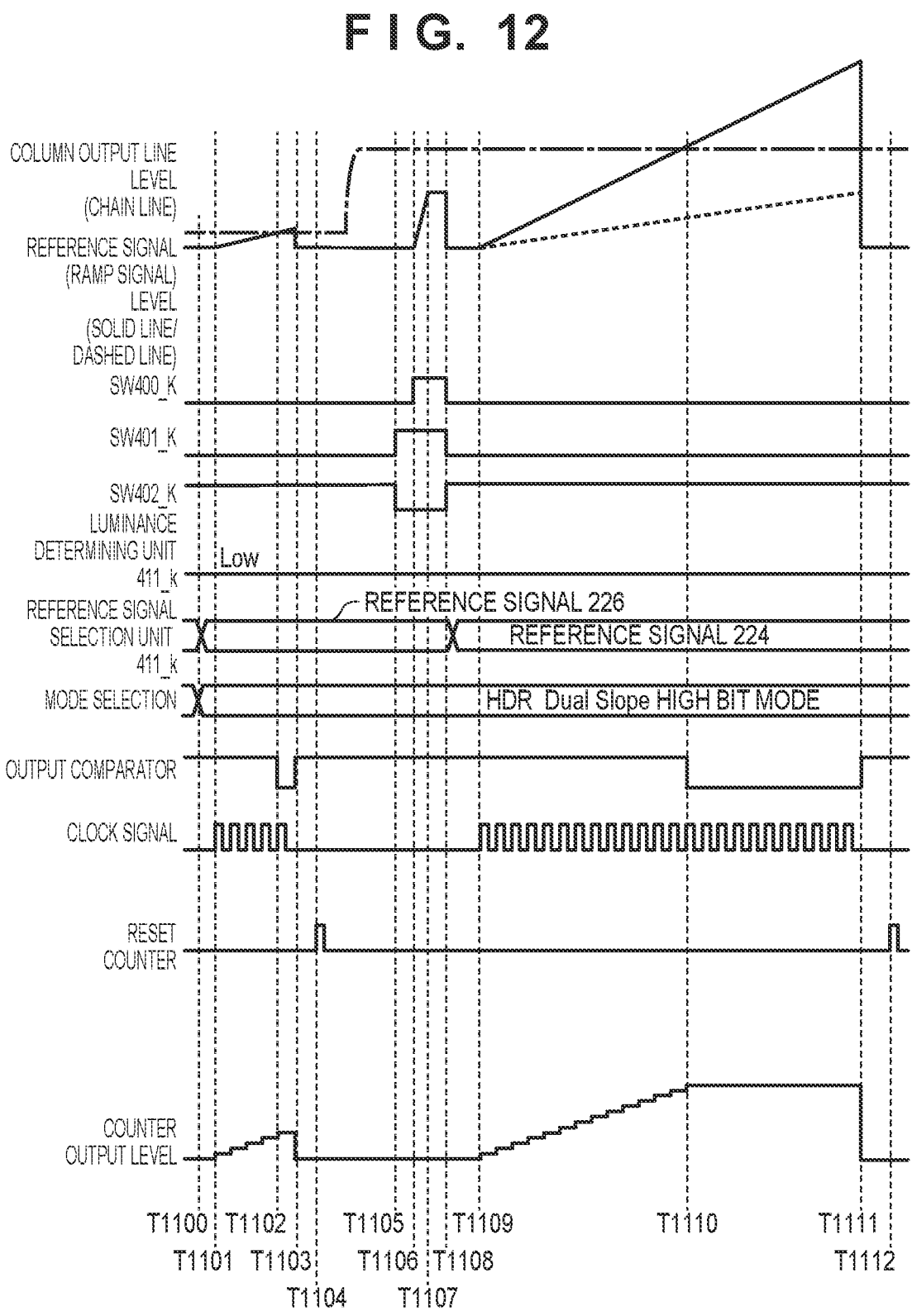
FIG. 12 is a timing chart illustrating an operation at a high signal level of HDR_DS_AD.

FIG. 11 is a timing chart illustrating the operation of high bit HDR_DS_AD at the low level. FIG. 12 is a timing chart illustrating the operation of high bit HDR_DS_AD at the high level. In DS_AD, an operation illustrated in the timing chart of either FIG. 11 or FIG. 12 is performed according to the signal level of each pixel.

First, the operation of high bit HDR_DS_AD at the time of the low level will be described with reference to the timing chart of FIG. 11.

At time T1000 of FIG. 11, the control unit 112 makes a setting for driving in HDR_DS_AD high bit mode in the register setting unit 230. The setting is also reflected in the reference signal generator 221. Here, the SS_AD low luminance reference signal 226 is selected.

At time T1001, the control unit 112 instructs the timing control unit 222 to output a clock signal of a predetermined cycle to the counter circuit 413 while the reference signal generator 221 scans the ramp signal. The counter circuit 413 counts the clock signal.

Since the reset release level and the ramp signal level of the pixel coincide with each other at time T1002, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T1003, the control unit 112 controls the timing control unit 222 to set the reference signal level to an initial value. The output of the comparator 410 is set to HIGH.

At time T1004, the control unit 112 controls the timing control unit 222 to store the counter value of the reset release level in the reset release level memory in the column memory 414. The counter circuit 413 is reset to an initial level via the reset signal 228. Thereafter, the pixel signal level is read out to the column output line 210.

At time T1005, the control unit 112 controls the respective switch signals in order to perform the luminance determination. To input the result of the comparator 410 to the signal level determination unit 412, the control unit 112 sets the switch SW 401 to HIGH. The switch SW 402 is set to LOW to disconnect the counter circuit 413.

At time T1006, the control unit 112 switches the switch SW 400 and inputs the luminance determination reference signal 223 to the comparator 410.

At time T1007, since the luminance determination reference signal 223 and the signal level coincide with each other within a predetermined period, the output of the comparator 410 changes from HIGH to LOW. In the example of FIG. 11, the signal level is low, the signal level determination unit 412 determines that the signal level is low, and the reference signal selection unit 411 selects the SS_AD low luminance reference signal 226.

At time T1008, in order to finish the luminance determination, the control unit 112 sets the switches SW 400 and SW 401 to LOW and sets the switch SW 402 to HIGH. The output of the comparator 410 is set to HIGH.

At time T1009, in order to AD convert the pixel signal level, the control unit 112 controls the reference signal generator 221 and starts scanning the ramp signal from the initial level. Also, the control unit 112 controls the timing control unit 222 to output a clock signal of a predetermined cycle to the counter circuit 413 while the reference signal generator 221 scans the ramp signal.

Since the signal level and the ramp signal level coincide with each other at time T1010, the output of the comparator 410 changes from HIGH to LOW. Since LOW output of the comparator 410 serves as an enable for the counter circuit 413, the counter circuit 413 stops counting when it set to LOW.

When the ramp signal is scanned to a predetermined level at time T1011, the control unit 112 controls the timing control unit 222 to set the reference signal level to an initial value. The output of the comparator 410 is set to HIGH. In HDR mode, the scan times from T1009 to T1011 are made longer than in Dual Slope mode of the normal image capturing.

At time T1012, the control unit 112 controls the timing control unit 222 to store the counter value of the signal level in the signal level memory in the column memory 414. The counter circuit 413 is reset to an initial level via the reset signal 228. The column memory 414 calculates a difference between the stored pixel signal level and the reset signal level, and outputs the result to the digital signal processing unit 211. By repeating this operation for each row, a low level image signal of the image capturing element 102 is read out.

Next, the operation of high bit HDR_DS_AD at the time of the high level will be described with reference to the timing chart of FIG. 12.

At time T1100 of FIG. 12, the control unit 112 makes a setting for driving in HDR_DS_AD high bit mode in the register setting unit 230. The setting is also reflected in the reference signal generator 221. Here, the SS_AD low luminance reference signal 226 is selected.

At time T1101, the control unit 112 instructs the timing control unit 222 to output a clock signal of a predetermined cycle to the counter circuit 413 while the reference signal generator 221 scans the ramp signal. The counter circuit 413 counts the clock signal.

Since the reset release level and the ramp signal level of the pixel coincide with each other at time T1102, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T1103, the control unit 112 controls the timing control unit 222 to set the reference signal level to an initial value. The output of the comparator 410 is set to HIGH.

At time T1104, the control unit 112 controls the timing control unit 222 to store the counter value of the reset release level in the reset release level memory in the column memory 414. The counter circuit 413 is reset to an initial level via the reset signal 228. Thereafter, the pixel signal level is read out to the column output line 210.

At time T1105, the control unit 112 controls the respective switch signals in order to perform the luminance determination. To input the result of the comparator 410 to the signal level determination unit 412, the control unit 112 sets the switch SW 401 to HIGH. The switch SW 402 is set to LOW to disconnect the counter circuit 413.

At time T1106, the control unit 112 switches the switch SW 400 and inputs the luminance determination reference signal 223 to the comparator 410.

Since there was no timing at which the luminance determination reference signal 223 and the signal level coincided with each other up to time T1107, the signal level determination unit 412 determines that the signal level is high, and the reference signal selection unit 411 selects the DS_AD low luminance reference signal 224. Here, the DS_AD low luminance reference signal 224 is shared with high bit HDR_DS_AD at the time of the high level.

At time T1108, in order to finish the luminance determination, the control unit 112 sets the switches SW 400 and SW 401 to LOW and sets the switch SW 402 to HIGH. The output of the comparator 410 is set to HIGH.

At time T1109, in order to AD convert the pixel signal level, the control unit 112 controls the reference signal generator 221 and starts scanning the ramp signal from the initial level. Also, the control unit 112 controls the timing control unit 222 to output a clock signal of a predetermined cycle to the counter circuit 413 while the reference signal generator 221 scans the ramp signal.

Since the signal level and the ramp signal level coincide with each other at time T1110, the output of the comparator 410 changes from HIGH to LOW. Since LOW output of the comparator 410 serves as an enable for the counter circuit 413, the counter circuit 413 stops counting when it becomes LOW.

When the ramp signal is scanned to a predetermined level at time T1111, the control unit 112 controls the timing control unit 222 to set the reference signal level to an initial value. The output of the comparator 410 is set to HIGH.

At time T1112, the control unit 112 controls the timing control unit 222 to store the counter value of the signal level in the signal level memory in the column memory 414. The counter circuit 413 is reset to an initial level via the reset signal 228. The column memory 414 calculates a difference between the stored pixel signal level and the reset release level, and outputs the result to the digital signal processing unit 211. By repeating this operation for each row, a high level image signal of the image capturing element 102 is read out.

The HDR DS_AD mode has more pixel bit information than normal AD conversion, and thus, for example, a high gain may be applied to a low-level signal, and a low gain may be applied to a high-luminance signal, and HDR images may be obtained by performing a process of joining determination value portions in the image capturing element. In addition, an HDR image may be obtained by sending a larger number of bits of data than normal to the image processing circuit 109 and performing image processing.

As described above, in the present embodiment, the bit precision of AD is changed, even for the same DS_AD, for DS_AD at the time of the normal image capturing and DS_AD at the time of HDR. As a result, in an image capturing apparatus equipped with the DS_AD function, high-quality HDR images can be obtained at a higher speed than with SS_AD in HDR mode.

Third Embodiment

In the third embodiment, switching between the HDR_SS_AD mode described in the first embodiment and the HDR_DS_AD mode described in the second embodiment will be described. FIG. 13 is a diagram illustrating switching between the HDR_SS_AD mode and the HDR_DS_AD mode illustrated in the second embodiment.

In the HDR_SS_AD mode, the high-bit AD described in the first embodiment is performed a plurality of times (two times in the present embodiment) on all pixels in SS_AD, a plurality of output images (two in the present embodiment) are acquired, and the output images are synthesized. In the HDR_DS_AD mode, the high-bit AD described in the second embodiment is performed once on all pixels in DS_AD, and low-level and high-level images are acquired and synthesized.

In the HDR_SS_AD mode, high-bit AD is performed a plurality of times (two times in the present embodiment), so that the readout speed is slightly slower, but a plurality of images (two images in the present embodiment) are outputted, so the degree of freedom in the image processing is increased. In the HDR_DS_AD mode, high-bit AD need only be performed once, so that the readout speed is faster than in the HDR_SS_AD mode.

For example, in a case where there is a desire to obtain an HDR image but there is a restriction on read time, the HDR_DS_AD mode can be selected, and the HDR_SS_AD mode can be selected when there is no restriction on the read time.

In the third embodiment, an example was given in which the HDR method is changed in the image capturing mode as described above. The AD conversion method can be changed for each image capturing mode in accordance with respective advantages.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-085707, filed May 24, 2023, which is hereby incorporated by reference herein in its entirety.

What is claimed is:

1. An image capturing apparatus, comprising:
a pixel for performing a photoelectric conversion;
an AD converter configured to perform an AD conversion;
at least one processor or circuit configured to function as:
a control unit configured to switch, based on an image capturing mode, an AD conversion with the AD converter between a first AD conversion mode in which an image signal is obtained by performing an AD conversion by comparing a signal of the pixel with one of a plurality of reference signals with different gradients of a temporal change of a signal level from each other and counting a clock signal of a predetermined cycle until the signal of the pixel matches one of the plurality of reference signals and a second AD conversion mode in which a plurality of image signals with different gains from each other are sequentially obtained by performing a plurality of AD conversions by sequentially comparing a signal of one pixel with a plurality of reference signals with different gradients of a temporal change of a signal level from each other and counting the clock signal of the predetermined cycle until the signal of one pixel matches each of the plurality of reference signals.

2. The image capturing apparatus according to claim 1, wherein in the first AD conversion mode, an AD conversion is performed with the AD converter by comparing the signal of the pixel with a first reference signal for which a gradient of a temporal change of a signal level is a first gradient or a second reference signal for which a gradient of a temporal change of a signal level is larger than that of the first reference signal, and in the second AD conversion mode, a plurality of AD conversions are performed with the AD converter by comparing a signal of one pixel with each of a third reference signal for which a gradient of a temporal change of a signal level is a third gradient and a fourth reference signal for which a gradient of a temporal change of a signal level is larger than that of the third reference signal, and
in a case where an AD conversion is performed in the second AD conversion mode, at least one of the first reference signal and the second reference signal is used for at least one of the third reference signal and the fourth reference signal.

3. The image capturing apparatus according to claim 1, wherein the at least one processor or circuit is further function as a determination unit configured to determine a signal level of the signal of the pixel.

4. The image capturing apparatus according to claim 3, wherein the determination unit determines the signal level of the signal of the pixel by comparing the signal of the pixel with a reference signal for determining a signal level.

5. The image capturing apparatus according to claim 3, wherein the AD converter switches a reference signal used in the first AD conversion mode in accordance with a determination result of the determination unit.

6. The image capturing apparatus according to claim 1, wherein in the first AD conversion mode, an SDR image signal is obtained.

7. The image capturing apparatus according to claim 1, wherein the at least one processor or circuit is further function as a synthesizing unit configured to synthesize a plurality of image signals obtained by the plurality of AD conversions performed in the second AD conversion mode.

8. The image capturing apparatus according to claim 7, wherein the synthesizing unit generates an HDR image signal by synthesizing a plurality of image signals obtained by the plurality of AD conversions.

9. A method for controlling an image capturing apparatus comprising a pixel for performing a photoelectric conversion and an AD converter for performing an AD conversion, the method comprising:
performing control to switch, based on an image capturing mode, an AD conversion with the AD converter between a first AD conversion mode in which an image signal is obtained by performing an AD conversion by comparing a signal of the pixel with one of a plurality of reference signals with different gradients of a temporal change of a signal level from each other and counting a clock signal of a predetermined cycle until the signal of the pixel matches one of the plurality of reference signals and a second AD conversion mode in which a plurality of image signals with different gains from each other are sequentially obtained by performing a plurality of AD conversions by sequentially comparing a signal of one pixel with a plurality of reference signals with different gradients of a temporal change of a signal level from each other and counting the clock signal of the predetermined cycle until the signal of one pixel matches each of the plurality of reference signals.

10. A non-transitory computer-readable storage medium storing a program for causing a computer to execute a method for controlling an image capturing apparatus comprising a pixel for performing a photoelectric conversion and an AD converter for performing an AD conversion, the method comprising:

performing control to switch, based on an image capturing mode, an AD conversion with the AD converter between a first AD conversion mode in which an image signal is obtained by performing an AD conversion by comparing a signal of the pixel with one of a plurality of reference signals with different gradients of a temporal change of a signal level from each other and counting a clock signal of a predetermined cycle until the signal of the pixel matches one of the plurality of reference signals and a second AD conversion mode in which a plurality of image signals with different gains from each other are sequentially obtained by performing a plurality of AD conversions by sequentially comparing a signal of one pixel with a plurality of reference signals with different gradients of a temporal change of a signal level from each other and counting the clock signal of the predetermined cycle until the signal of one pixel matches each of the plurality of reference signals.

* * * * *